Figure 8:
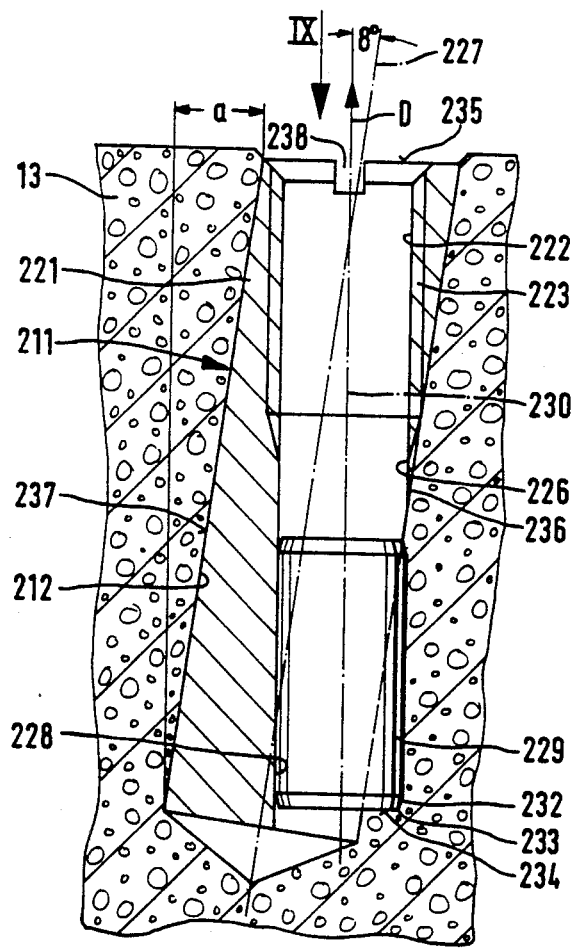

United States Patent [19]

Kessler

[11] Patent Number: 4,685,847
[45] Date of Patent: Aug. 11, 1987

[54] POSTIVE-LOCKING DOWEL FOR CONCRETE

[75] Inventor: Jürgen Kessler, Stuttgart, Fed. Rep. of Germany

[73] Assignee: Stumpp & Kurz GmbH & Co., Fed. Rep. of Germany

[21] Appl. No.: 777,983
[22] PCT Filed: Jan. 15, 1985
[86] PCT No.: PCT/DE85/00010
§ 371 Date: Sep. 17, 1985
§ 102(e) Date: Sep. 17, 1985
[87] PCT Pub. No.: WO85/03332
PCT Pub. Date: Aug. 1, 1985

[30] Foreign Application Priority Data

Jan. 17, 1984 [DE] Fed. Rep. of Germany ....... 3427228
Sep. 17, 1985 [DE] Fed. Rep. of Germany ....... 8401123

[51] Int. Cl.$^4$ ............................ F16B 13/04; E04B 1/40
[52] U.S. Cl. ............................................ 411/22; 52/698
[58] Field of Search ................... 411/21, 22; 52/158, 52/159, 698, 704, 706, 708

[56] References Cited

U.S. PATENT DOCUMENTS 1,333,880 3/1920 Stine ....................................... 52/698
4,116,105 9/1978 Herman ................................. 411/22

Primary Examiner—James L. Ridgill, Jr.
Attorney, Agent, or Firm—Jones, Tullar & Cooper

[57] ABSTRACT

Mould locking dowel (11) for concrete, provided with a dowel sleeve (21) traversed by a plurality of holes (26) arranged on the circonference and inclined with respect to the longitudinal axis, wherein are inserted pins (29) to keep the dowel (11) into a hole (12) in the concrete. In this mould locking dowel (11) intended for concrete and of easy handling, the holes (26) for the pins (29) are arranged in the front end areas of the dowel sleeve (21) according to a sharp angle with respect to the longitudinal axis (27) of the dowel sleeve (21) so that the pins (29) penetrate, when in the final drive-in state, only on a portion of the diameter thereof in the concrete and that they are during the drive-in motion, brought throughout their length into the holes (26) arranged in part as an open channel (28) in the dowel sleeve (21).

27 Claims, 14 Drawing Figures

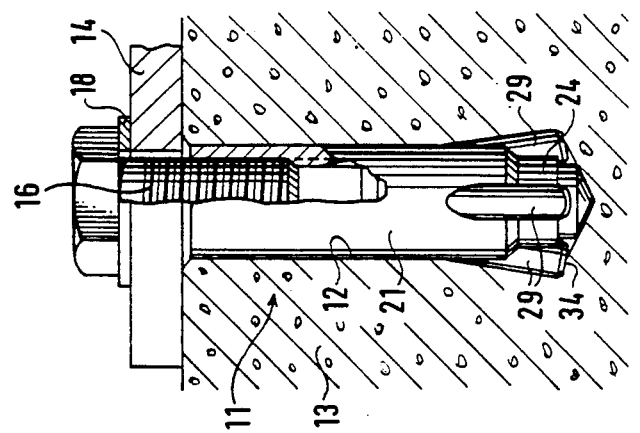
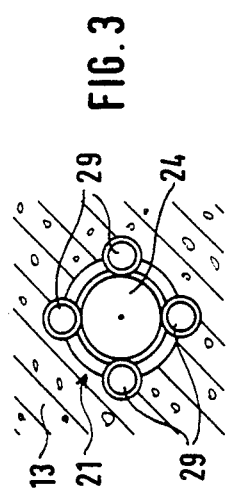
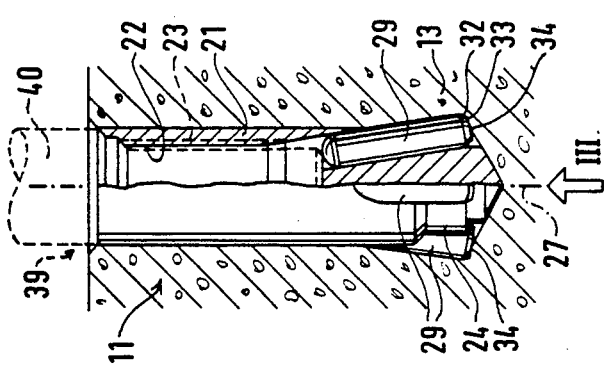
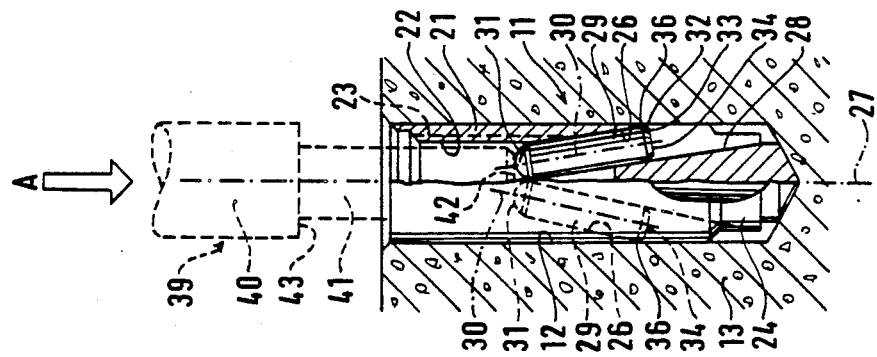

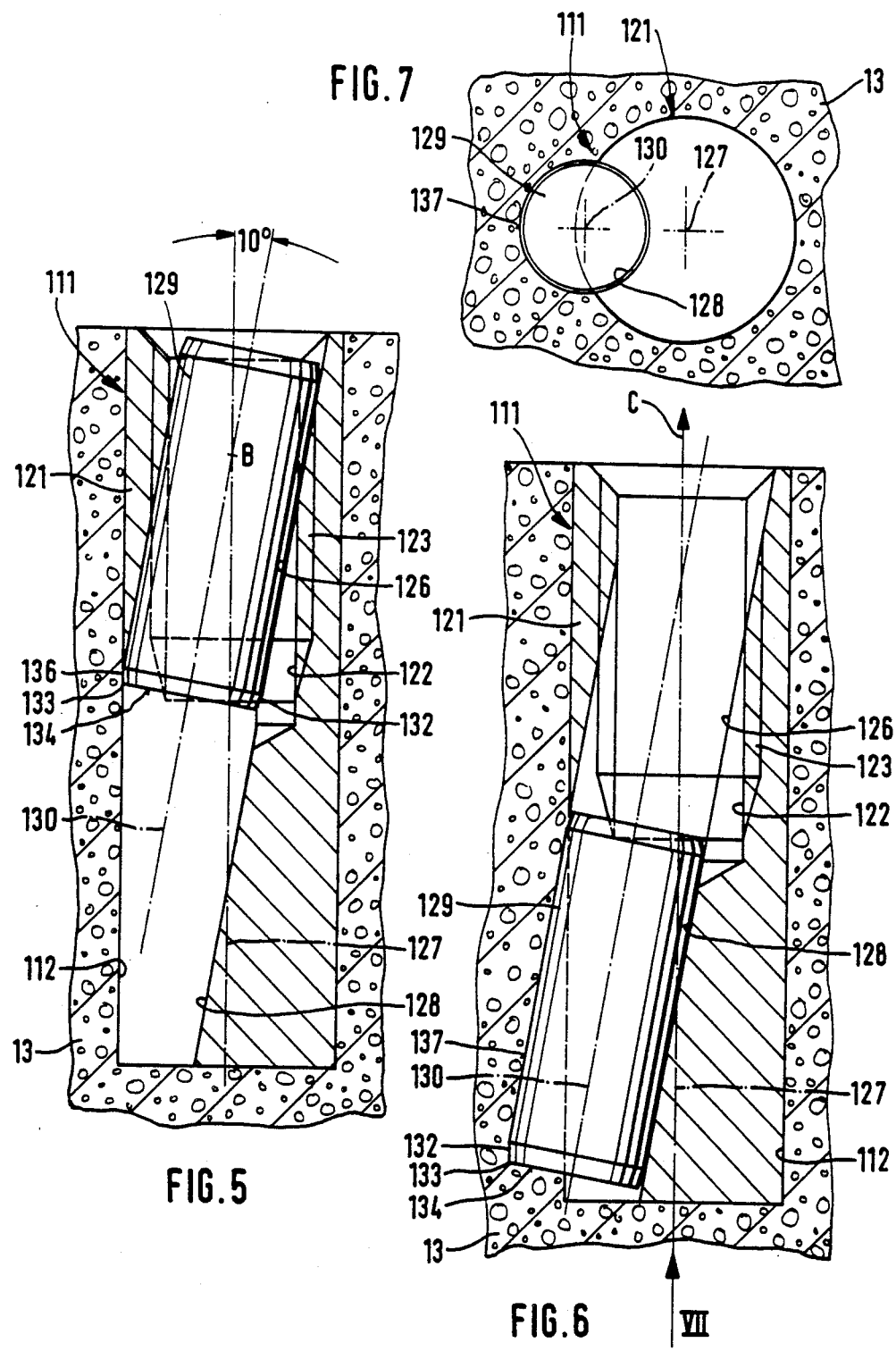

POSTIVE-LOCKING DOWEL FOR CONCRETE

The present invention is directed to a positive-locking dowel for hard building materials, especially concrete, having a dowel casing which is penetrated by at least one bore disposed on the periphery of the dowel casing and extending obliquely to the longitudinal axis of the dowel casing, into which a pin is inserted to hold the dowel in a bore of the building material.

A positive-locking dowel of this kind, only usable in connection with soft building materials, for instance brick or the like, is known from German patent DE-PS No. 83 223. In this known positive-locking dowel the four pins which are oriented obliquely to the longitudinal axis of the dowel are disposed at the rear of the dowel casing and are radially directed outwardly at an angle of more than 60° to the longitudinal axis. The driving of these pins is accomplished by means of a driving tool in such a manner that the pins glide along the cone of the driving tool with their inner ends. This positive-locking dowel is not suitable for hard building materials, such as concrete, for a number of reasons: the pins are driven into the construction material with their entire surface which means that they will have to drill a hole through this construction tool. Since the pins are disposed at the back end of the dowel casing there is the danger, if a strong force is used, that the dowel casing will rupture at its back end and/or that the masonry will crack in this area. There is the further disadvantage that the forces which can be brought to bear on the object to be secured are very limited.

It is an object of the present invention to produce a positive-locking dowel of the noted species which is suitable for use with hard building materials, especially for concrete, and can be used in a simple manner.

This object is attained in a positive-locking dowel of the noted species in that the bore for that pin is preferably disposed in the area of the front portion of the dowel casing at an acute angle to the longitudinal axis of the dowel casing and is partially formed as an open trough, and in that the pin in its driven-in final position penetrates with only a part of its diameter the building material, with the pin being guided and supported along its entire length by the bore.

Since, in the positive-locking dowel in accordance with the present invention, the at least one pin is preferably disposed in the area of the inner end of the dowel casing and therefore preferably generally close to the bottom of the bore, the positive-locking dowel can be exposed to considerably higher forces, since the part which assures the positive locking is placed very low, i.e. it can tolerate a larger extraction force. The very shallow angle further means that the pins can chip along the inner walls of the bore or can partially dig in, however, they do not penetrate the wall with their entire surface. In this manner it is possible to achieve a positive locking between the positive-locking dowel and the inner wall of the bore. In addition, in the positive-locking dowel in accordance with the present invention the at least one pin can be driven directly from the rear and in a generally axial direction, so that practically no force deflection from the driving tool to the pin is necessary. To sufficiently guide the pin without twisting and to support the pin during the driving process, the length of the bore provided in the dowel casing, partially in the form of an open trough, is at least approximately equal to the length of the bolt.

In accordance with an exemplary embodiment of the present invention, the bore and the pin(s) are oriented at an acute angle of approximately 3° to 20° to the longitudinal axis of the dowel casing.

To achieve the driving of the bolt into the inner wall of the bore with relatively little effort, the pin, in the final, driven-in position, extends from the outer periphery of the dowel casing by about half of its diameter. This means that the pin will only dig in to the extent of about half its cross-section, and also only with its front section, into the bore wall. This is sufficient for secure holding.

To prevent falling out of the dowel casing to the outside as well as the inside, the pin, which is introduced into the guide bore during the intial phase of placement inside the dowel casing, is secured by press-fitting of the outer bore wall at the end of the closed part of the guide bore. In case of two or more pins these are further secured in that they abut against each other with their inner, rounded ends, in the initial phase of introduction into the dowel casing.

So that the front of the pin cannot dig into the bore wall serving as a guide, but can still chisel into the concrete bore inner wall, the front of the bolt changes into an outer bevel with a sharp edge.

With two or more pins in a positive-locking dowel in accordance with the present invention, the front end of the dowel casing, containing the bores in the form of an open trough, has a smaller diameter, thereby making it possible for the concrete chiseled from the bore walls by the pins to find room between the front end of the dowel casing and the inner wall of the bore.

The positive-locking dowel can be equipped with an inner thread for accomodating a fastening screw or with an outer thread to accomodate a fastening nut wherein, in the latter case, it is constructed in such a way that it can be used for push-through installation.

In accordance with further exemplary embodiments of the present invention a single bore for a single pin is provided, the outer diameter of which is about equal to or greater than the inner diameter of the installation bore of a dowel casing for a fastening element. Such a positive-locking dowel can be fabricated in an especially simple and cost-efficient manner compared with a positive-locking dowel equipped with two or more pins. Furthermore, a positive-locking dowel of this construction is considerably smaller in its dimensions while having the same inner thread diameter and the same load.

The positive-locking dowel in accordance with this preferred exemplary embodiment is very cheap to produce.

In accordance with one of the above-mentioned exemplary embodiments, in which the positive-locking dowel is equipped with an inner thread in the installation bore of the dowel casing extending in the longitudinal axis of the dowel casing, the core diameter of the inner bore is somewhat smaller than the outer diameter of the pin and an oblique bore for the pin has been cut through the inner thread bore of the dowel casing. Handling of this positive-locking dowel is especially simple, since it can be inserted into a bore hole made in the conventional manner in any desired way and can then be tamped down by means of driving in the single pin. The pin can be inserted in a simple manner from the back during installation, i.e. from the side of the inner thread bore, and can be driven in during the tamping of the positive-locking dowel from this end into the bore. As a consequence, when tamped in, the obliquely driven pin bears the entire load in general together with the friction component between the inner wall of the bore and the outer surface of the dowel casing opposite the pin, which is caused by the force of the driven-in pin against the dowel casing.

In accordance with the other example of the above-identified exemplary embodiments with only a single bore for a single pin and with an inner thread in the installation bore of the dowel casing, the longitudinal axis of the inner thread bore is disposed at an acute angle to the longitudinal axis of the dowel casing. This positive-locking dowel is inserted into a bore provided with the noted acute angle in such a way that the longitudinal axis of the inner thread bore, and thereby of the fastening screw, is consequently oriented perpendicularly to the fastening surface. Since the load attached to the positive-locking dowel acts in this direction, a much larger bearing surface of the dowel in the concrete is achieved, different from the one above-cited exemplary embodiment, since the load bearer is not the pin, but almost the entire dowel casing. The pin itself generally only acts as a safety. A further advantage is that the driving force during the tamping of the dowel, i.e. during the driving of the pin, is transferred to this pin directly and with full force. This positive-locking dowel in accordance with the noted preferred variant is especially useful where there is a danger of cross-shaped cracks in the concrete at the respective fastening site. If it is feared that a possible cross-shaped crack might form in the direction of the longitudinal axis of the inner thread bore, it is easy to see that a very large part of the load bearing surface of the dowel casing moves away from the area of this cross-shaped crack as it gains depth, so that such a dowel will hold more securely in such a case.

This positive-locking dowel is especially advantageous in case of multiple fastenings, especially when the dowel casings, set obliquely, point away from each other, so that the forces acting on the masonry are, for instance, acting in directions away from each other in the form of a star. The above is also applicable to fastening systems in which the dowel casing is inserted into a bore which extends at an acute angle to the main force direction of the dowel.

For technical manufacturing reasons it is practical to provide the bore for the pin coaxially to the inner thread bore. However, it is also possible, in order to increase the security of the dowel in a cross-shaped crack, to dispose the longitudinal axis of the bore for the pin also at an acute angle to the longitudinal axis of the inner thread bore, wherein this angle is pointing away from that acute angle between the longitudinal axes of the bores for the pin and the dowel casing.

It is practical, for a simple manufacture of the bore for the positive-locking dowel, to place the longitudinal axes of the inner thread bore and the dowel casing in a common median longitudinal axis of the dowel. In this case the corresponding bore in the concrete wall must be made either vertically in a downward direction or horizontally towards one side. However, it is also possible to place these longitudinal axes in different planes which cross.

Since, in the above mentioned preferred exemplary embodiment of the positive-locking dowel, the load is mainly taken up exclusively by the outer surface of the dowel casing, it may be advantageous in some applications to provide the dowel casing with an inner extension which considerably extends beyond the position of the pin after the dowel has been tamped in, because with an increase in the length of the dowel casing and, accordingly, an increase in the depth, anchoring is considerably improved, especially in case of the appearance of a cross-shaped crack.

In accordance with a further preferred example of the above mentioned embodiment with only a single bore for a single pin, the dowel is additionally equipped with an expanding casing disposed approximately at the position of the pin when the dowel is in the tamped-in position. Such a dowel is even more advantageous in case of the above mentioned cross-shaped crack because in this case it can continue to expand, if the bore is widened on account of a pulling load, by means of the expanding casing, so that again a secure anchoring is achieved. This means that the dowel, normally held in the bore hole by means of positive locking, is now additionally held by frictional forces in case a cross-shaped crack appears in the fastening area.

For practical reasons the expanding casing is located in an area of the dowel casing which is narrower by the thickness of the wall of the expanding casing, so that only the normal cylindrical bore in the respective wall need be provided for the dowel. The required expansion or secondary expansion of the dowel practically takes place across a conical outer surface provided at the narrowed part of the dowel casing.

To guarantee an effective expansion of the expansion casing in the above described case of a cross-shaped crack, the expansion casing is provided with a reduction in the wall thickness on the side away from the open end, preferably in the form of a slit.

It is furthermore of advantage if the pin, in its starting position in the guide bore, extends with its front end into the opening of the open side of the expanding casing, since by means thereof the expanding casing is held in its correct position and the pin is held in its starting position during the mounting of the dowel in a secure manner.

Further details of the invention can be seen from the ensuing description in which the invention is further described and explained by means of the exemplary embodiments shown in the drawing.

Figure 9:
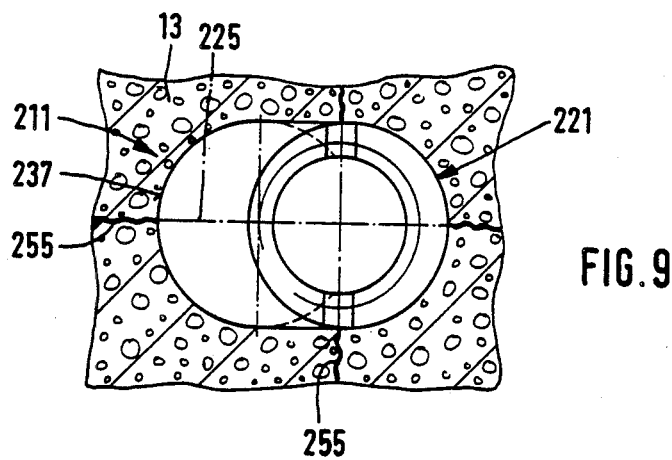
Figure 12:
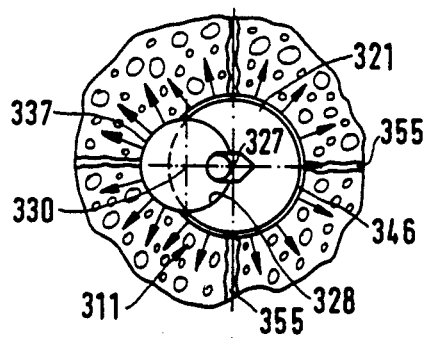
Figure 10:
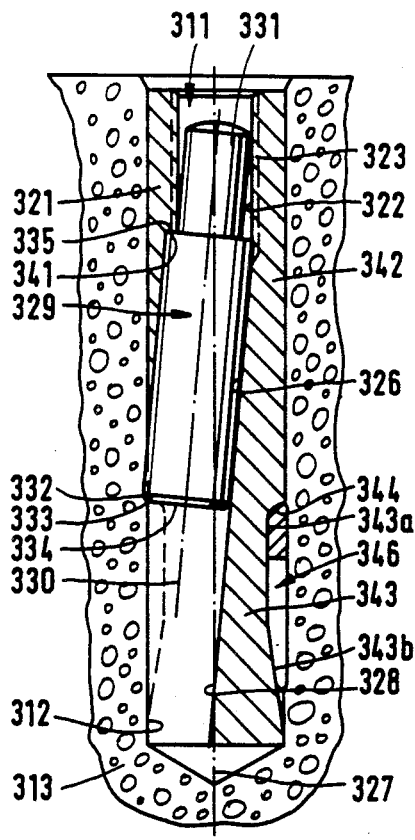
Figure 11:
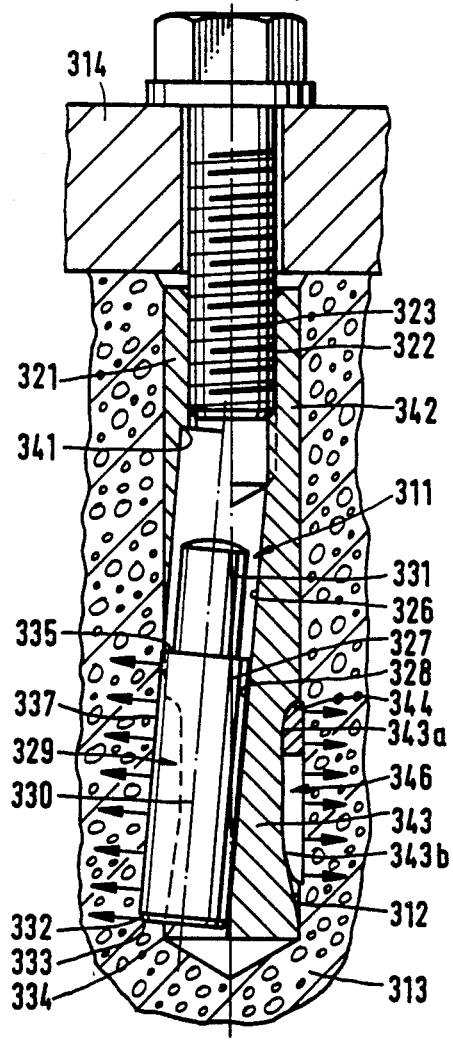
Figure 13:
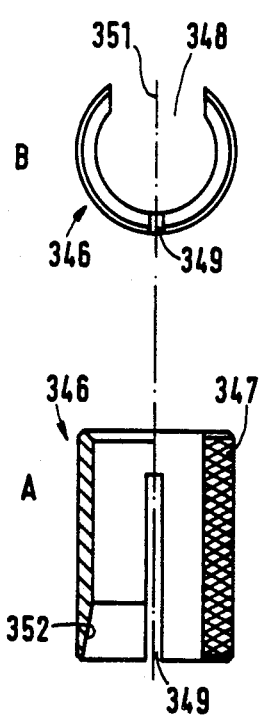
Figure 14:
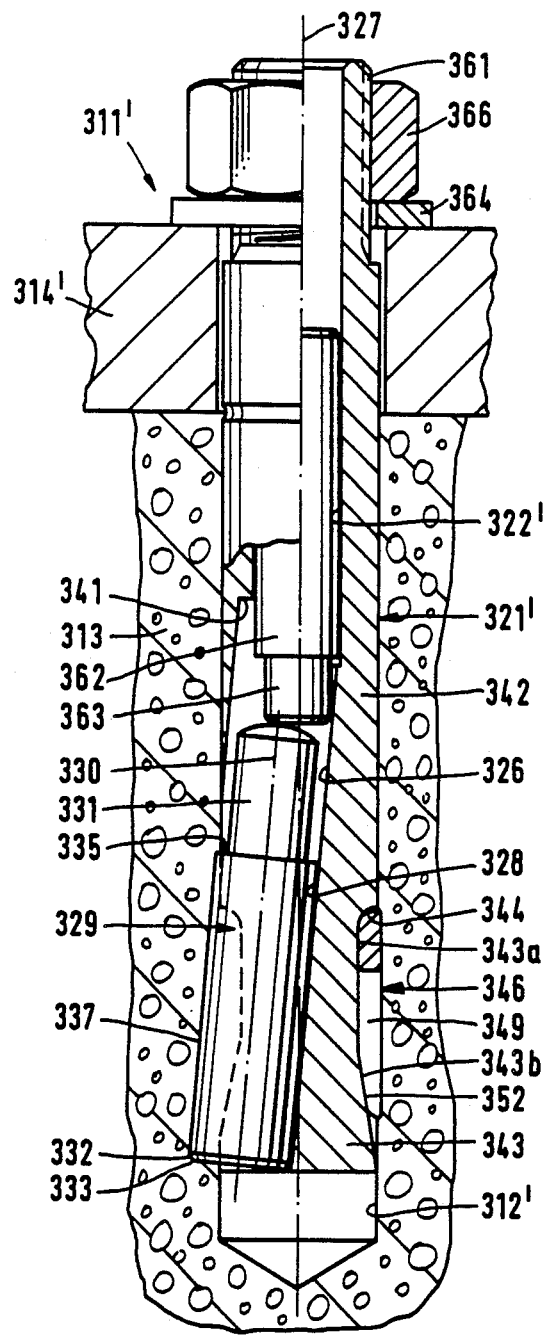

FIG. 1 shows, in a partially cut-away view, a side elevational view of a positive-locking dowel in accordance with a first exemplary embodiment of the present invention in the position of being inserted into the bore hole, FIG. 2 shows a view of the positive-locking dowel in accordance with FIG. 1, but in a position where it is tamped into the bore hole in a positive locking manner, FIG. 3 shows a bottom view of the positive-locking dowel in accordance with the arrow III of FIG. 2, FIG. 4 shows a view of a positive-locking dowel in accordance with FIG. 2, but in its final position, wherein an object has been fastened with a screw and by means of the positive-locking dowel, FIG. 5 shows a partially cut-away view of a positive-locking dowel in accordance with a second exemplary embodiment of the present invention, in the position of being inserted into the bore hole, FIG. 6 shows a view of the positive-locking dowel in accordance with FIG. 5, but in a position where it is tamped into the bore hole in a positive-locking manner, FIG. 7 shows a bottom view of a positive-locking dowel in accordance with the arrow VII of FIG. 6, FIG. 8 shows a partially cut-away side view of a positive-locking dowel in accordance with a third exemplary embodiment of the present invention in a position where it is tamped into a bore hole in a positive locking manner, FIG. 9 shows a top elevational view of a positive-locking dowel in accordance with the arrow IX of FIG. 8, FIG. 10 shows a partially cut-away side view of a positive-locking dowel in accordance with a fourth exemplary embodiment of the present invention in a starting position of being inserted in a bore hole, FIG. 11 shows a view of a positive-locking dowel in accordance with FIG. 10, but in a position of being tamped into the bore hole, FIG. 12 shows a bottom view of the positive-locking dowel in accordance with the arrow VII of FIG. 6, FIGS. 13A, B shows a view, half side-elevational and half in cross section and a plan view, respectively, of the expanding casing used in the fourth exemplary embodiment, and FIG. 14 shows a partially cut-away side view of a positive-locking dowel in accordance with a variant of the fourth exemplary embodiment of the present invention, used for push-through installation, in a position where it is tamped in a positive-locking manner into a bore hole.

The positive-locking dowel 11, 111, 211 or 211', shown in the drawing and made of metal is used for positive-locking anchoring within a cylindrical bore 12, 112, 212, 312 or 312' in a concrete wall 13 or similar wall or ceiling made of a hard building material and thereby for the fastening of an object 14 by means of a screw 16 or a nut at the wall concerned.

In accordance with the first exemplary embodiment shown in FIGS. 1 to 4 of the present invention the dowel 11 has a dowel casing 21 equipped with a concentric blind-end bore 22 which is equipped over a large portion thereof with an inner thread 23. The dowel casing 21 is smoothly formed on the outside of its back surface and shows on its front end a solid concentric extension 24 with a smaller diameter.

Four guide bores 26, equally positioned around the periphery, extend over the front half of the dowel casing 21, oriented, in the exemplary embodiment, at an angle of 10° 30' to the longitudinal axis 27. The guide bores 26 are oriented at this acute angle to the longitudinal axis 17 in such a manner that they extend from the inside to the outside, seen from behind, and reach to about the front end of the extension 24 which has a smaller diameter. As can be seen from FIGS. 1 to 4, the guide bores 26 emerge at about half of their length from the wall of the dowel casing 21 and continue from there towards the front end in the shape of an open trough 28, the sidewalls of which become smaller towards the front end of the casing 21. Because the blind-end bore 22 in the casing 21 terminates about in the area of the emergence of the guide bores 26 from the casing 21, the guide bores 26 have, in their part which forms the trough 28, a guide surface, formed by the bottom of the trough 28, for pins 29 inserted therein.

As can be seen from FIGS. 1 to 4, a case-hardened pin 29 has been inserted into each guide bore 26, the outside diameter of which is only a little smaller than the inside diameter of the guide bores 26, so that each pin 29 is kept easily movable within the guide bore 26. The length of the pins 29 is approximately equal to one-half the total length of the guide bores 26. Each pin 29 has on its rear inner end a spherically formed cap 31 and on its front end a bevel 32, which turns into the circular front face 34 via a sharp edge 33.

As shown in FIG. 1, the pins 29 are inserted in their initial position into the guide bores 26 from the front in such a manner, that the edge of their front faces 34 is at about the level of the outer periphery of the casing 21. The values for the angle of the guide bore axis in respect to the longitudinal axis of the casing 27 and for the length of the pins 29 have been selected in such a manner that the pins 29 touch at their inner end 31 or abut against each other, so that they cannot fall or slide into the inside of the dowel casing 21. In other words, the pins 29, in the exemplary embodiment four evenly spaced around the circumference, are supported by one another in the initial position within the blind-end bore 22 of the dowel casing 21. A dropping-out from the guide bores 26 of the dowel casing 21 in a forward direction of the pins 29 brought into the initial position or inserted is avoided in that the outer wall of the dowel casing 21 is twisted in the area of the exit of the guide bores 26 from the casing 21, for instance in the area 36, i.e. it is slightly deformed in the direction of the bore, so that the pins 29 are slightly pinched.

As can be seen from FIG. 1, the positive-locking dowel 11 is inserted in the assembled initial position into the respective bore 12 of a concrete wall 13 or the like, wherein the depth of the bore 12 is approximately the same as the length of the positive-locking dowel 11. Next, a driving tool 39, having a thicker driving end 40 and a driving punch 41 of a smaller diameter which fits into the blind end bore 20, is positioned in such a manner that the face 42 of the punch 41 abuts against the end caps 31 of all four pins 29. By beating with a hammer on the tool 39 in the direction of the arrow A, the pins 29 are advanced in the direction of the longitudinal axis 30 of the guide bores 29, which means that they dig into or chisel into the surface of the wall of the concrete wall bore 12 with their edges 33. The pins 29 are driven in until the front faces 34 of the pins 29 approximately are at a level with the end of the extension 24 of the dowel casing 21. In order to check this, the punch 41 of the tool 39 is of a length equivalent to the drive-in depth, so that the shoulder 43 of the tool 39 comes to rest against the outer end of the dowel casing 21 after the pins 29 have been sufficiently driven in.

FIG. 2 shows this anchored position of the positive-locking dowel 11 and it can be seen at the same time that the pins 29 with their front faces 34 merely extend beyond the outer surface area of the dowel casing 21 by an amount which is at most equal to half of their diameter. In other words, the pins 29 have not bored into the wall of the concrete wall bore 12 with their entire surface, but have only dug into the surface with half their own surface through the chiseling out of material. The material thus dug out comes to rest in a manner not shown in the area between the extension with a smaller diameter 24 and the inner wall of the concrete wall bore 12.

As can be seen in FIG. 4, an object 14 which is to be fastened, can be placed against the concrete wall 13 and can be fastened by means of the screw 16 which engages the inner thread 23 of the dowel casing 21. For practical reasons a biased lock washer 18 is placed between the object 14 and the head of the screw 16. The tightening force of the screw can be tested with a torque wrench.

FIGS. 5 to 7 show, in accordance with a second exemplary embodiment of the present invention, a dowel 111 which in principle acts the same as the dowel 11 of FIGS. 1 to 4, but only has one single hardened pin 129 in a single guide bore 126 in a dowel casing 121.

The dowel casing 121 has a blind-end bore 122 extending from the rear end which is equipped with an inner thread 123 and which extends over approximately half the length of the casing 121. The longitudinal axis of the blind-end bore 122 is identical to the longitudinal axis 127 of the dowel casing 121. The guide bore 126 is disposed in such a manner that its longitudinal axis 130 forms an acute angle, in the exemplary embodiment 10°, with the longitudinal axis 127 of the dowel casing 121 or of the blind-end bore 122. The guide bore 126 extends over the entire length of the dowel casing 121 in such a manner that its longitudinal axis 130 intersects with the longitudinal axis 127 of the dowel casing 121 at a point B which is located close to the rear end of the dowel casing 121. This results in the guide bore 126 being partially disposed as an open trough, namely in that area which extends from about the inside last third of the inner thread 123 to the inner or front end of the dowel casing 121. Additionally, the guide bore 126 is integrated at its rear portion with the inner thread blind-end bore 122 by being partially worked into it as can be seen from FIGS. 5 and 6. By means of this the inner thread 123 is partially cut by the guide bore 126, however, a sufficient number of turns remain, having a sufficient depth, to securely hold a fastening screw, not shown here.

The single pin 129 is made of case-hardened solid round stock and has an outer diameter corresponding to the inner diameter of the guide bore 126. Since, in the exemplary embodiment, the core diameter of the inner thread 123 is kept slightly smaller than the outer diameter of the pin 129, the result is that in the area of the trough bottom at the juncture of the upwardly open end of the inner thread 123 with the trough 128 a juncture with a relatively shallow step is created, to the effect that, since the guide bore 126 is continuous, in addition to a simple insertion from behind of the pin 129 into the dowel casing 121, the former can also be pushed through into the open trough 128. The pin 129 has a bevel 132 at its front portion which transitions via a sharp chisel edge 133 into the front face 134. In the initial position shown in FIG. 5, the pin 129 is kept in an area 136 of the dowel casing 121 which area approximately defines the exit of the guide bore 126 from the dowel casing 121 and which is wedged or slightly deformed in the direction towards the pin so that the pin 129 is slightly pinched.

Manufacture of the dowel casing 121 is done through all steps from its rear portion, i.e. the blind-end bore 122 as well as the inner thread 123 and the guide bore 126 can be formed from this one end. The dowel casing 121 has a length of a little more than double the length of the pin 129.

The tamping of the dowel 111 is done in a manner similar to that of the dowel 11 of FIGS. 1 to 4. A purely cylindrical bore 112 is made in a concrete wall 13, which extends perpendicularly to the outer surface of the concrete wall 13. The dowel 111 in its initial position in accordance with FIG. 5 is inserted into this bore 112, the inner diameter of the bore being equal to the outer diameter of the dowel casing 121 and the depth of the bore being equal to the length of the dowel casing 121. In order to drive in the pin 129, a driving tool similar to the tool 39 of FIG. 1 is put into place and the pin 129 is brought into the position shown in FIG. 6 by being moved along the guide surface formed by the trough 128. Because the dowel casing 121 slightly extends beyond the pin 129 in the tamped position, room for the concrete, chiseled by the chisel edge 133 of the pin 129 out of concrete bore wall, is left. As can be seen from FIGS. 6 and 7, the pin 129 in its tamped in state, extends beyond the outer surface of the dowel casing 121 with barely one-half of its diameter and has been tamped in by about half its own length, compared to the initial position. In any case, the pin 129 has been driven in far enough that its rear portion completely clears the inner thread 123 to make possible the insertion of a fastening screw. In this exemplary embodiment the surface 137 which extends beyond the outer surface of the dowel casing 121 acts as load support surface, if the dowel 111 is stressed in the direction of the arrow C.

FIGS. 8 and 9 show a dowel 211 in accordance with a third exemplary embodiment of the present invention. This dowel 211 also has a dowel casing 221 with a blind-end bore 222 having an inner thread 223 as well as a single guide bore 226 and which also accepts a single case-hardened pin 229. The pin 229, too, has a bevel 232 on it front inner portion which transitions via a sharp chisel edge 233 into the flat front face 234. Here, too, the wedge area 236 is provided approximately at the exit of the guide bore 226 from the dowel casing 221 in order to maintain the pin 229 in the initial position shown in FIG. 11. The dowel casing 221 is provided at its rear portion or annular edge 235 with two diametrically opposed tool slits 238 which define the position of the guide bore 226 when the dowel 211 is inserted into the concrete bore 212, since they extend in the direction of the longitudinal axis 230 of the guide bore and their plane of communication is disposed perpendicularly to a plane 225, in which lie the longitudinal axis 230 of the guide bore 226 as well as, according to FIG. 9, the longitudinal axis 227 of the dowel casing 221 and which forms a symmetrical plane of the dowel 211.

The tamping of the dowel 211 is accomplished as follows: By means of a drill or the like equipped with a suitable adapter a purely cylindrical bore 212 is worked or drilled into the concrete wall 213 at a corresponding angle of, in this case, 90°+8° to the outer surface of the concrete wall 213. Diameter and depth of the oblique concrete bore 213 corresponds to the outer diameter and the length of the dowel casing 221. Then the dowel 211 in its initial position in accordance with FIG. 11 is inserted into the oblique bore 212 in such a manner that the longitudinal axis 230 of the inner thread blind-end bore 222 extends perpendicularly to the outer surface of the concrete wall 213.

In this third exemplary embodiment of the present invention the longitudinal axis 230 of the guide bore 226 is also disposed at an acute angle, in this case 8°, to the longitudinal axis 227 of the dowel casing 221. Differing from the preceding exemplary embodiment, however, in this case the longitudinal axis 230 of the guide bore 226 is disposed coaxially with the longitudinal axis of the blind-end bore 222, i.e. these two longitudinal axes of the guide bore 226 and the blind-end bore 222 coincide. The inner diameter of the guide bore 226 is equal to the core diameter of the inner thread 223. The blind-end bore 222 with the inner thread 223 and the guide bore 226 start at the rear portion 235 of the dowel casing 221 which is correspondingly angular in respect to the longitudinal axis 227 of the dowel, but at right angles to the longitudinal axis 230 of the bore, and wherein the inner thread 223 ends before the exit point of the guide bore 226 from the dowel casing 221, the latter being continued to the front or inner portion of the dowel casing 221 in the form of an open trough 228.

The dimensions are also such that the length of the dowel casing 221 is a little more than double the length of the pin 229 and that the inner thread 223 extends over approximately one-half the length of the dowel casing 221 and that the open trough 228, corresponding to its oblique course in respect to the longitudinal axis 227 of the casing, becomes increasingly lower of flatter, seen from behind. This is accomplished by means of a tool not further shown, with which the pin 229 is tamped or driven into the position shown in FIG. 8. The driving force is transferred from the tool directly, i.e. without force deflection, in a straight line to the pin 229 which chisels into the bore wall and which is driven in sufficiently far so as to leave completely free the inner thread 223 for the screwing-in of a fastening screw.

If the dowel 211 is stressed against the driving-in direction, that is in the direction of the arrow D, then in this case the outer surface of the dowel casing 221 facing away from the pin 229 is provided as load bearing surface 237. This surface is considerably larger than the load bearing surface 137 in the exemplary embodiment of FIGS. 5 to 7, so that the dowel 211 holds better, especially in the case of the cross-shaped crack 255 shown in FIG. 9.

In a variation of this third exemplary embodiment, not shown, of the present invention, the dowel is identical, except for an extension, with the dowel 211 of FIGS. 8 and 9. This proposed extension of the dowel casing 221 in the direction towards the inside means that for this dowel a deeper oblique bore 212 in the concrete wall 13 must be provided, resulting in a deeper seating of this dowel. Because of this the inner portion of the extension is displaced, in relation to the rear portion 235, to the side by a factor larger than the corresponding factor a between the inner portion of casing 221 and the rear portion 235 in accordance with FIG. 8. The size of the extension can be chosen accordingly.

The aforementioned acute angles may also have differing values in a range from 3° to 20° in all exemplary embodiments.

With the third exemplary embodiment of FIGS. 8 to 10, inclusive of its variation, a fastening system has been created in which the dowel casing 221 of the dowel 211 has been inserted into a bore 212 extending at an acute angle to the direction of the main stress of the dowel by the object to be fastened, i.e. perpendicularly to the outer surface of the wall, ceiling or the like, the longitudinal axis of the bore forming the same acute angle with this main stress as the longitudinal axes 227, 230 of the dowel casing 221 and of the inner thread 222, 223 do with each other. This is especially advantageous in a fastening system using two or more dowels in the case when the bores 212, which extend at acute angles to each other, point into directions away from each other or extend away from each other.

In accordance with another variation of the last described third exemplary embodiment of the present invention, the longitudinal axes 230 or 227 of the guide bore 226 and blind-end bore 222 on the one hand and of the dowel casing 221 on the other do not lie in a common plane, but are also at acute angles to each other in the third dimension and therefore arranged in two planes which cross each other. In accordance with a further variation the longitudinal axes of the guide bore 226 and the blind-end bore 222 are not identical but are arranged at acute angles to one another in accordance with the second exemplary embodiment of FIGS. 5 to 7, namely in such a manner that the longitudinal axis 230 of the guide bore 226 is turned away from the longitudinal axis 227 of the dowel casing 221, relative to the longitudinal axis of the blind-end bore 222, the latter extending perpendicularly to the outer surface of the concrete wall 13 when the dowel 211 or 211' has been tamped in.

FIGS. 10 to 12 show, in accordance with a fourth (preferred) exemplary embodiment of the present invention, a dowel 311 which, in principle, is formed the same way as the dowel 111 of FIGS. 5 to 7 and works the same way and which, in addition to a single case-hardened pin 329 in a single guide bore 326 in a dowel casing 321 also shows an expanding casing 346 on the dowel casing 321.

The dowel casing 321 has a blind-end bore 322 starting at the rear portion, which is provided with an inner thread 323 extending only over about one-third of the length of the casing 321. The longitudinal axis of the blind-end bore 322 is identical with the longitudinal axis 327 of the dowel casing 321. The guide bore 326 is disposed in such a manner that its longitudinal axis 330 extends at an acute angle of, in the exemplary embodiment 10°, to the longitudinal axis 327 of the dowel casing 321 or the blind-end bore 322. The guide bore 326, here applied from the direction of the end of the dowel casing 321 facing away from the blind-end bore 322, extends over the remaining portion, for instance two-thirds, of the total length of the dowel casing 321 in such a manner that a step 341 is formed in an area of the inner diameter at the transition from the guide bore 326 to the blind-end bore 322, said step being disposed in the area of the inner portion of the inner thread 323 of the blind-end bore 322. Here, too, the result is that the guide bore 326 is partially formed in the shape of an open trough 328, namely over an area of about two-thirds of its length up to the inner, i.e. front portion of the dowel casing 321. The guide bore 326 is larger in diameter than the inner thread blind-end bore 322.

The dowel casing 321, in this preferred embodiment of the present invention longer than in the second preferred embodiment of FIGS. 5 to 7, has a cylindrical rear part 342 and a front part 343, integrally joined to it and being provided at least in part with an outer cone. The transition between the parts 342 and 343, the front part 343 of which is only a little shorter than the rear, cylindrical part 342, takes place via a protrusion 344 to which is joined, seen from the back, a cylindrical area 343a and then a conical area 343b of the outer diameter of the front part 343, the latter of which at its foremost end resumes the same outer diameter as the cylindrical rear part 342. The cone angle of the conical outer diameter surface part 343b is about 8 to 9°. This outer protrusion only affects the height of the open trough 328 and not of its still steady bottom surface.

The single pin 329 consists of case-hardened solid round stock and has an outer diameter corresponding to the inner diameter of the guide bore 326. An extension 331 of a smaller diameter is provided at the rear portion of the pin 329 which can engage the inner thread blind-end bore 322 and creates an annular shoulder 335 abutting against the step 341 in the initial position where the pin is inserted into the dowel casing 321 in accordance with FIG. 10. The pin 329, to be inserted into the guide bore 326 at the front portion of the dowel casing 321, has a bevel 332 at its front portion which transitions via a chisel edge 333 into the front face 334.

The expanding casing 346 used with the dowel 311 of the preferred exemplary embodiment in accordance with the present invention consists, in accordance with FIG. 13, of a casing formed completely cylindrically on the outside and partially cylindrically on the inside having longitudinal slits in a peripheral area and extending to a little more than 270° in circumference. This metallic expanding casing 346 has a milled edge 347 on its outer diameter and has, on the side diametrically opposite its open side 348, a considerably narrower slit 349 worked into a considerable portion of the length of the expanding case 346 starting at the front end as seen in the position of use. The length of the slot 349 is about ¾ of the total length of the expanding case 346. The sides of the slit 349 extend, as do the side areas of the open side 348 of the expanding casing 346, parallel to the corresponding median longitudinal plane 351. The inner circumference of the expanding casing 346 is provided at its front portion with a cone 352 extending over approximately a quarter of the entire length of the expanding casing. The angle of this inner conical area 352 corresponds to the cone angle of the outer conical surface 343b of the front portion 343 of the dowel casing 321.

Assembly of the dowel 311 is performed by mounting the expanding casing 346 in accordance with FIG. 10 on the front portion 343 of the dowel casing 321 in such a way that the expanding casing 346, in a position in which the open side of the open trough 328 extends at right angles to the open side 348 of the expanding casing 346, is pushed over the front portion 343 of the dowel casing 321 and is then turned 90°. Thus the open side 348 of the expanding casing 346, in line with the opening of the open trough 328, lies next to the closed part of the guide bore 326. The pin 329 can then be inserted from the front end of the dowel casing and with its extension 331 forward, into the open trough 328 and pushed forward in the direction of the blind-end bore 322. While the pin 329 is inserted the expanding casing 346 is elastically spread a little, since the inside diameter of the open side 348 of the expanding casing 346 is a little less than the outer diameter of the pin 329. The pin 329 is pushed in far enough that its annular shoulder 335 rests against the step 341. The pin 329, the parts 342 and 343 of the dowel casing 321 and the expanding casing 346 are dimensioned in such a way that in this inserted position of the pin 329 only the bevel 332 of the pin 329 extends into the area of the expanding casing 346, so that the latter can snap back again and secure the pin 329 in the guide bore 326 against falling out. This way an elastically flexible unity of the assembled dowel 311 has been achieved, since not only the pin 329 is held in the correct position in the guide bore, but also the expanding casing 346 is held correctly on the front portion 343 of the dowel casing 321. As seen in FIG. 10, in this state the conical inner surface 342 of the expanding casing 346 abuts against the conical outer surface 343b of the dowel casing 321.

The tamping of the dowel 311 is done in the same manner as that of the dowel 11 of FIGS. 5 to 7. The tamped in position is shown in FIGS. 11 and 12. In this connection it should be noted that during the driving in process of the pin 329 the expanding casing 346 does not move at all or only little on the front portion 343 of the dowel casing 321. Adding the expanding casing 346 not only results in creating the load bearing surface 337, indicated in FIG. 11 by arrows, in the area of the pin 329 extending beyond the dowel casing 321, but also in the opposite outer surface area of the expanding casing 346. A further effect of the expanding casing 346 consists in that, in the case of the aforementioned cross-shaped crack 355 (see FIG. 12) in the concrete of the wall 313 with the resulting widening of the bore 312 and loosening of the dowel 311 because of the load, the expanding casing 346 slides off the front portion 343 of the moving dowel casing 321 and over the cone 343b, thereby spreading out, so that this results in a renewed tamping, in addition to the positive-locking now also in the form of pressure-locking, of the dowel 311 in the bore 312.

FIG. 14 shows a variation of the dowel 311 of the fourth exemplary embodiment in the form of a dowel 311'. Basically both dowels 311' and 311 are identically formed, however, the dowel 311' is longer than the concrete wall bore 312' into which it is to be inserted and it is used to fasten the object 314' in push-through installation. While the dowel casing 321 of the dowel 311 in accordance with FIGS. 10 to 12 extend to the outer surface of the concrete wall 313, the dowel casing 321' of the dowel 311' penetrates the corresponding bore of the object 314' which is to be fastened and extends beyond its outside with its outer thread 361. The dowel 311' has, in the same manner and the same construction, a blind-end bore 322' which, however has no inner thread but is smooth, a guide bore 326', into which a pin 329' is inserted, and an expanding casing 346'. See the dowel 311 in respect to the construction of the latter. To tamp in the dowel 311' by means of the driving in of the pin 329', a driving pin 362 is additionally provided which is movably supported in the blind-end bore 322' and the front end 363 of which, having a smaller diameter, abuts against the extension 331 of the pin 329. After the dowel 311', inserted through the bore of the object 314' to be fastened into the concrete wall bore 312', has bee tamped in, a nut 366 is threaded on the outer thread 361 after a washer 364 has been inserted and the object 314' is thus fastened.

I claim:
1. A positive-locking dowel for reception within a bore formed in a hard building materials, especially concrete, comprising:
  a casing defining a longitudinal axis and including at least one pin guide bore disposed at an acute angle to the longitudinal axis of the casing, said pin guide bore being partially formed as an open trough; and
  a pin for each pin guide bore, each pin having a front end and a rear end, said front end serving to penetrate to the building material, wherein:
  each pin guide bore includes a surface which serves to guide its respective pin throughout its displacement from an initial position to a driven-in final position, and means for holding its respective pin in assembly with the casing in the initial position of said pin; and
  in the driven-in final position, each pin penetrates only by a part of its diameter the building material thereby holding the dowel in the bore of the building material.
2. The positive-locking dowel is defined in claim 1, further wherein:
  in their initial position, the front end of each pin is situated adjacent to the open trough portion of its respective pin guide bore; and
  in their drive-in final position, each pin is situated within the open trough portion of its respective pin guide bore.

3. The positive-locking dowel as defined in claims 1, further wherein:
the casing includes as least two pin guide bores disposed at an acute angle to the longitudinal axis of the casing; and
the pins in each pin guide bore engage each other in the initial position with their rear ends, such engagement assisting in holding the pins in assembly with the casing in said initial position.

4. The positive-locking dowel as defined in claim 1, further wherein:
the casing defines a central bore concentric with the longitudinal axis, with each pin guide bore opening into said central bore; and
each pin is inserted into its respective pin guide bore through said central bore.

5. The positive-locking dowel as defined in claim 1, further wherein:
the pin guide bores are disposed at an acute angle of approximately 3° to 20° to the longitudinal axis of the casing.

6. The positive-locking dowel as defined in claim 1, further wherein:
each pin is preferably case hardened; and
in its driven-in final position each pin extends beyond the outer surface of said casing by approximately one-half of its diameter.

7. The positive-locking dowel as defined in claim 1, further wherein:
the means for holding the pin in assembly with the casing comprising a deformation of the surface of the pin guide bore at that portion thereof adjacent to its open trough.

8. The positive-locking dowel as defined in claim 1, further wherein:
the front end of each pin includes a transition into an outer bevel with a sharp edge.

9. The positive-locking dowel as defined in claim 1, further wherein:
the front part of the dowel casing containing the open trough of each pin guide bore has a smaller diameter than that of the remainder of the casing, and is preferably solid.

10. The positive-locking dowel as defined in claim 1, further wherein:
the casing defines a central bore concentric with the longitudinal axis; and
a single pin guide bore and associated pin are provided, with the outer diameter of the pin being at least equal to the inner diameter of the central bore.

11. The positive-locking dowel as defined in claim 10, further wherein:
a thread is provided on the inner surface of the central bore, the core diameter of said thread being smaller than the outer diameter of the pin; and
the single guide bore through the said thread.

12. The positive-locking dowel as defined in claim 10, further wherein:
said thread defines a longitudinal axis which is disposed at an acute angle to the longitudinal axis of the casing.

13. The positive-locking dowel as defined in claim 12, further wherein:
the acute angle between the longitudinal axis of the thread and the longitudinal axis of the casing lies between 3° and 20°, preferably at approximately 8°.

14. The positive-locking dowel as defined in claim 12, further wherein:
the single pin guide bore is coaxial with the inner surface of the central bore defining the thread.

15. The positive-locking dowel as defined in claim 12, further wherein:
the longitudinal axis of the thread and the casing are located in a common median longitudinal plane of the dowel.

16. The positive-locking dowel as defined in claim 12, further wherein:
the casing provided with an inner extension which extends outwardly of the pin in the bore of the building material in the drive-in final position of the pin.

17. The positive-locking dowel as defined in claim 12, further wherein:
the casing includes at least one tool slit extending in the direction of the longitudinal axis of the thread.

18. The positive-locking dowel as defined in claim 10, further comprising:
an expanding casing disposal approximately at the position of the pin in the driven-in final position of the pin.

19. The positive-locking dowel as defined in claim 18, further wherein:
the casing defines a step located at the transition between the central bore and the pin guide bore; and
the pin defines a limiting shoulder which engages the step.

20. The positive-locking dowel as defined in claim 18, further wherein:
the casing in preferably tapered to an extent equal to the wall thickness of the casing in that region of the casing surrounded by the expanding casing.

21. The positive-locking dowel as defined in claim 20, further wherein:
the tapered area is provided with a conical outer surface.

22. The positive-locking dowel as defined in claim 18, further wherein:
the expanding casing has an open side, the opening of which is aligned with the opening of the open trough of the pin guide bore.

23. The positive-locking dowel as defined in claim 22, further wherein:
the expanding casing has an area of reduced wall thickness, preferably in the form of a slit, on the side opposite its open side.

24. The positive-locking dowel as defined in claim 22, further wherein:
the inner diameter of the open side is smaller than the outer diameter of the pin.

25. The positive-locking dowel as defined in claim 22, further wherein:
the pin extends with its front end into the opening of the open side of the expanding casing when in its initial position.

26. A fastening structure including at least one positive-locking dowel for reception within a bore formed in a hard building material, such as a wall, ceiling, or the like, said at least one positive-locking dowel comprising:
a casing defining a longitudinal axis and including at least one pin guide bore disposed at an acute angle to the longitudinal axis of the casing, said pin guide bore being partially formed as an open trough; and a pin for each pin guide bore, each pin having a front end and a rear end, said front end serving to penetrate the building material, wherein:

each pin guide bore includes a surface which serves to guide its respective pin throughout its displacement from an initial position to a driven-in final position, and means for holding its respective pin in assembly with the casing in the initial position of said pin;

in the driven-in final position, each pin penetrates only by a part of its diameter the building material thereby holding the dowel in the bore of the building material; and the casing extends into the bore of the building material at an acute angle to the main force direction of the dowel.

27. The fastening system as defined in claim 26, further wherein:

two or more positive-locking dowels are included within the casing and diverging from each other.

* * * * *